United States Patent [19]

Stephan

[11] 4,365,909
[45] Dec. 28, 1982

[54] COUPLING CLAMP AND A METHOD OF MANUFACTURE THEREFOR

[75] Inventor: Gérard Stephan, Croissy, France

[73] Assignee: Nadella, France

[21] Appl. No.: 92,841

[22] Filed: Nov. 9, 1979

[30] Foreign Application Priority Data

Nov. 15, 1978 [FR] France ............................. 78 32226

[51] Int. Cl.³ .................. F16C 11/06; F16D 1/12; F16J 1/16
[52] U.S. Cl. .................................. 403/157; 339/95 B; 24/256; 403/287; 403/302; 403/313; 413/12
[58] Field of Search ............... 403/157, 158, 159, 290, 403/313, 373, 142, 302, 287; 339/95 B, 229, 230, 125; 113/116 H, 116 V, 116 AA, 116 HH; 24/256

[56] References Cited

U.S. PATENT DOCUMENTS

| | | | |
|---|---|---|---|
| 1,795,031 | 3/1931 | McCurdy | 403/79 X |
| 1,903,863 | 4/1933 | Hayden | 403/79 |
| 2,171,455 | 8/1939 | Roadfuss | 113/116 H |
| 3,356,396 | 12/1967 | Drown | 403/290 |
| 3,893,744 | 7/1975 | Porazinski | 339/230 R |

*Primary Examiner*—Wayne L. Shedd
*Attorney, Agent, or Firm*—Robert E. Burns; Emmanuel J. Lobato; Bruce L. Adams

[57] ABSTRACT

Disclosed herein is a coupling clamp formed by shaping a sheet-metal blank or tube length and having an axially slotted hollow body (14) forming a socket for a shaft or other transmission member and having a lug (17) depending from either side of the slot (15), the lugs being pierced (18) for the passage of a bolt or the like by which the clamp can be tightened to bear radially onto a shaft, at least one of the lugs having at least one internal tab (13) extending at least part-way across the slot and shaped to bear radially onto a shaft on tightening the clamp.

11 Claims, 4 Drawing Figures

COUPLING CLAMP AND A METHOD OF MANUFACTURE THEREFOR

The present invention relates to coupling clamps and more particularly relates to such clamps formed from a sheet-metal blank or tube length.

Such coupling clamps are already known of the type comprising an axially slotted hollow body forming a socket for a shaft or other transmission member and having a lug depending from either side of the slot, the lugs being pierced for the passage of a bolt or the like by which the clamp can be tightened to bear radially onto the shaft.

In order to obtain desired life and good retention of the shaft, particularly in the region of the slot, it has been proposed either to fold the ends of the blank upon themselves to form lugs of double thickness the internal portion of which, i.e. the extreme end of the blank, is shaped so that it can bear radially onto the shaft, or to place an attached part between the lugs, tightening the clamp compressing the part to bear radially onto the shaft.

These known solutions give rise to clamps which, at least for certain applications, are unnecessarily heavy and which require machining operations in the manufacture and, when they are formed by several pieces possess the additional drawback of requiring delicate handling and assembly.

The object of the present invention is to remedy these above-stated drawbacks by providing a clamp formed from a single lighter part by a simpler and thus more economical method of manufacture and provided with means to ensure, in operation, good radial retention of a shaft.

According to the present invention, a coupling clamp, formed by shaping a sheet-metal blank or tube length, has an axially slotted hollow body forming a socket for a shaft or other transmission member and has a lug depending from either side of the slot, movement of one lug towards the other causing the clamp to tighten and bear radially onto a shaft, and is characterised in that at least one of the lugs has at least one internal tab extending at least part-way across the slot and shaped to bear radially onto a shaft on tightening the clamp.

According to a first embodiment of the invention, the tab is formed by a, preferably local, axial extension of the lug, bent up therefrom.

According to a second embodiment of the invention, the inner edge of the tab is shaped to continue the inside shape of the body across the axial slot to increase circumferential grip of the clamp on a shaft.

A coupling clamp in accordance with the invention enables, by the use of a simple localised extension, a body to be obtained that has a shape complementary to that of a shaft to be clamped and which nearly completely circumferentially grips the shaft.

Additionally, the elimination of double thickness lugs enables the bolt holes to simply be punched.

The above and other features of the invention are illustrated, by way of example, by the Drawings, in which.

Figure 1:
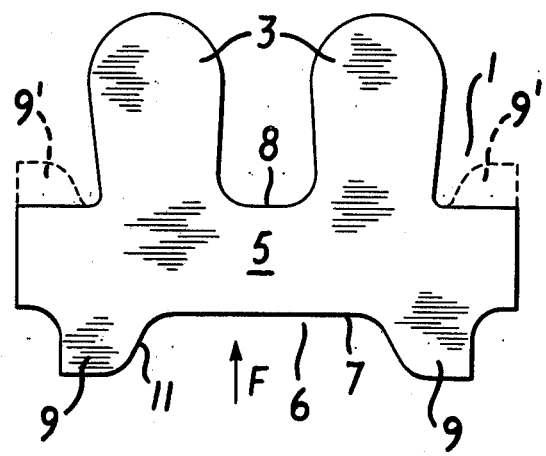
FIG. 1 is a plan view of a sheet-metal blank of a coupling clamp in accordance with the invention.

FIG. 1 shows a substantially flat, sheet-metal blank cut to a shape wherein two tongues are connected to one side 8 of a central rectangular portion 5. A pair of tags 9, each positioned towards one end of the central portion 5, are connected to the other side 6 of the central portion.

The inside 11 of each tag 9 where it joins middle part 7 of side 6 is shaped so that, after the blank has been rolled to form a coupling clamp, as explained below, these insides 11 complete the shape of the socket.

In an embodiment of the invention, further tags 9', shown in dotted line in the figure, are provided level with the ends of the central portion 5, the tags 9' being connected to side 8 and respectively outside of tongues 3. In certain circumstances better retention of a shaft in the socket is obtained by use of such additional tags 9'.

Figure 2:
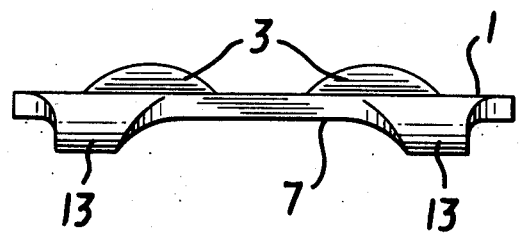
FIG. 2 is a side elevation of the clamp of FIG. 1, partly formed.

FIG. 2 shows a side elevation of a partly rolled blank when viewed from the direction of arrow F in FIG. 1. Tongues 3 have each been rolled about the longitudinal axes and the tags 9 have been folded to be substantially perpendicular to the plain of the central portion 5 and to form a pair of tabs 13.

The forming of the coupling clamp is completed by further rolling of the blank around tabs 13 and towards the middle part 7.

Figure 3:
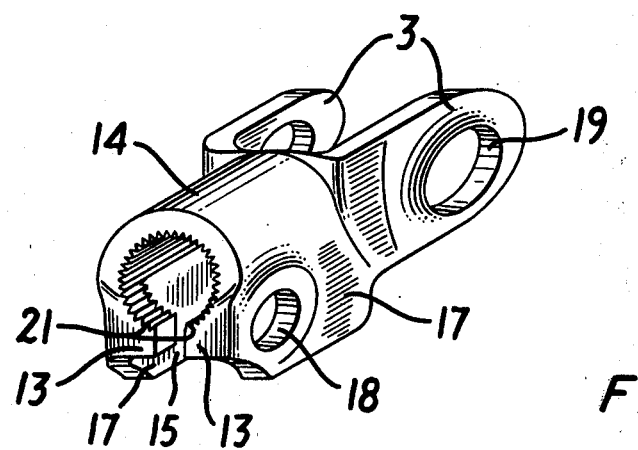
FIG. 3 is a perspective view of the clamp of FIG. 1, fully formed.

FIG. 3 shows the completed coupling clamp to consist of a generally cylindrical hollow body 14 having an axial slot 15 to either side of which depends a lug 17 (each formed by one end of the blank central portion 5). The lugs 17 are pierced by holes 18 for the passage of a bolt (not shown) the screwing of which into a nut acts to draw one lug towards the other. By this means a shaft or like transmission member 24 fitted in the socket formed by the inside of the body 14 is held by radial pressure of the clamp onto the shaft. Each lug 17 has one of the tabs 13 protruding inwardly part way across the axial slot. The inner edge 21 of each tab 13 (formed by the insides 11 of tags 9) is shaped so that they nearly complete the circular form of the inside of the body 14, the socket. Thus, on tightening of the clamp, the tabs 13 can bear by their inner edges 21 against a shaft so that the shaft is nearly totally circumferentially clamped.

The elimination of the prior art double thickness lugs enables the holes 18 to be simply punched from the blank, thus avoiding costly machining operations.

During manufacture of the coupling clamp by the above procedure, the two tongues 3 are additionally formed in known manner to form the yoke for a universal joint, each arm of the yoke having a bore 19 to receive a bearing cage.

Figure 4:
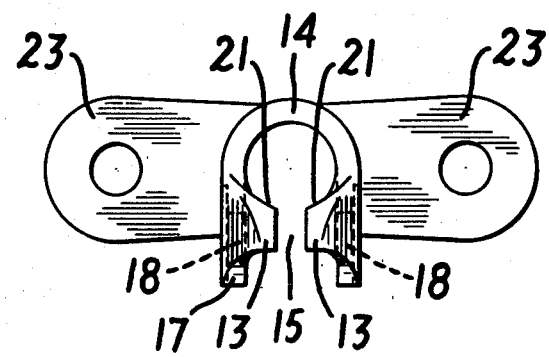
FIG. 4 is an end elevation of an alternative form of clamp.

FIG. 4 shows an alternative form of coupling clamp that is generally similar to that described above, similar parts having been given similar references but for connecting a shaft to a flexible disc of, for example, the "flector" type. In this form corresponding to tongues 3, at least one and preferably two flanges 23 are bent outwardly away from the clamp body 4 to lie in a plain substantially perpendicular to the body axis.

The invention is not limited to either of the embodiments hereinbefore described but applies to any coupling clamp having a split body which, as known per se may be cylindrical or have any other geometric form and which may be internally smooth or axially splined, (as shown in FIG. 3).

Coupling clamps in accordance with the invention could, instead of being formed from a sheet-metal blank, be formed from a length of tubing one end of which is shaped to form the tongues 3 or flanges 23 and the other end of which form the clamp body 4, having been at least partially axially split and cut out so as to form, after folding, lugs 17 and tabs 13.

I claim:

1. In a coupling device which is made from a single piece of a sheet metal or tubing blank and comprises an axially extending tubular body portion which defines a socket for axially receiving a transmission member, and two spaced-apart lugs which extend from said body portion and define an axially extending throughway slot in said body portion and are provided for receiving clamping means for urging said lugs toward each other for clamping said body portion onto said transmission member; the improvement comprising an integral tab on at least one of said lugs which tab extends directly toward said other lug a distance less than the width of said slot in a plane substantially perpendicular to said tubular body.

2. A device according to claim 1, wherein said tab is formed from said lug.

3. A device according to claim 1, wherein the other of said lugs comprises a tab substantially similar to said tab in shape and disposition relative to said body and said tabs define a gap therebetween.

4. A device according to claim 1 or 2, wherein said clamping means comprise a bolt and said one lug defines an aperture adjacent said tab for receiving said bolt.

5. In an assembly comprising a transmission member and a coupling device which coupling device is made from a single piece of a sheet metal or tubing blank and comprises an axially extending tubular body portion which defines a socket in which socket is coaxially engaged said transmission member, two spaced-apart lugs which extend from said body portion and define an axially extending throughway slot in said body portion, and clamping means combined with said lugs for urging said lugs toward each other and thereby clamping said body portion onto said transmission member; the improvement comprising an integral tab on at least one of said lugs which tab extends directly toward said other lug a distance less than the width of said slot in a plan substantially perpendicular to said tubular body, said tab defining an edge which bears on a part of the periphery of said transmission member when said body portion is clamped by said clamping means.

6. An assembly according to claim 5, wherein said tab is formed from said lug.

7. An assembly according to claim 5, wherein the other of said lugs comprises a tab substantially similar to said tab in shape and disposition relative to said body and said tabs define a gap therebetween, said tab of said other lug also defining an edge which bears against a part of the periphery of said transmission member when said body portion is clamped by said clamping means.

8. An assembly according to claim 5 or 6, wherein said edge of said tab has a shape which is complementary to the shape of said part of said periphery of said transmission member.

9. A device according to claim 1, 2 or 3, comprising on an end of said tubular body portion remote from said tab a yoke for a universal joint.

10. A device according to claim 1, 2 or 3, comprising two flanges which extend from an end of said tubular body portion remote from said tab substantially radially from said tubular body portion for connection of the device.

11. An assembly according to claim 5, 6 or 7, wherein each of said lugs defines an aperture and said clamping means comprise a screwthreaded member and means defining a tapped hole in which tapped hole said screwthreaded member is screwthreadedly engaged, said screwthreaded member extending through said apertures.

* * * * *